United States Patent
Croize

(10) Patent No.: US 8,640,228 B2
(45) Date of Patent: Jan. 28, 2014

(54) SYSTEM FOR MANAGING RIGHTS OF ACCESS TO AVIONIC APPLICATIONS AND DATA AND METHOD IMPLEMENTED BY THIS SYSTEM

(75) Inventor: Xavier Croize, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 929 days.

(21) Appl. No.: 12/599,433

(22) PCT Filed: Apr. 29, 2008

(86) PCT No.: PCT/FR2008/050772
§ 371 (c)(1),
(2), (4) Date: May 14, 2010

(87) PCT Pub. No.: WO2008/145934
PCT Pub. Date: Dec. 4, 2008

(65) Prior Publication Data
US 2010/0287601 A1 Nov. 11, 2010

(30) Foreign Application Priority Data
May 10, 2007 (FR) ...................................... 07 54988

(51) Int. Cl.
*G06F 7/04* (2006.01)

(52) U.S. Cl.
USPC .......................................................... 726/20

(58) Field of Classification Search
USPC .......................................................... 726/20
See application file for complete search history.

(56) References Cited

U.S. PATENT DOCUMENTS

| 6,816,762 | B2 | 11/2004 | Hensey et al. | |
|---|---|---|---|---|
| 6,859,688 | B1 * | 2/2005 | Orf et al. ............................ | 701/3 |
| 2003/0037243 | A1 * | 2/2003 | Gruteser et al. ............... | 713/185 |
| 2003/0109973 | A1 * | 6/2003 | Hensey et al. ................... | 701/35 |
| 2007/0042765 | A1 * | 2/2007 | Bailin et al. ................... | 455/419 |

OTHER PUBLICATIONS

International Search Report dated Nov. 7, 2008.
Written Opinion dated Nov. 7, 2008.

* cited by examiner

*Primary Examiner* — Krista Zele
*Assistant Examiner* — James Forman
(74) *Attorney, Agent, or Firm* — Greer, Burns & Crain Ltd.

(57) ABSTRACT

A system for managing a user's access rights to avionic information, loaded on board an aircraft, that includes at least one identification device able to read the user's identity information contained on a personal card, and an avionic computer having means of managing access rights able to authenticate the user and determine access rights to avionic information based on the user's identity.

10 Claims, 1 Drawing Sheet

SYSTEM FOR MANAGING RIGHTS OF ACCESS TO AVIONIC APPLICATIONS AND DATA AND METHOD IMPLEMENTED BY THIS SYSTEM

CROSS-REFERENCE TO RELATED APPLICATIONS

This application is the National Stage of International Application No. PCT/FR2008/050772 International Filing Date, 29 Apr. 2008, which designated the United States of America, and which International Application was published under PCT Article 21 (s) as WO Publication No. WO2008/145934 A1 and which claims priority from, and the benefit of, French Application No. 200754988 filed on 10 May 2007, the disclosures of which are incorporated herein by reference in their entireties.

BACKGROUND

The aspects of the disclosed embodiments relate to a system for managing user access rights to avionic applications and data, i.e., information about aircraft flight and security.

The aspects of the disclosed embodiments also relate to a process used by this access control system.

The disclosed embodiments have applications in the field of aeronautics and particularly in the field of aircraft security to select the personnel authorized to access certain information stored in the aircraft computer.

SUMMARY

At the present time in aeronautics, the different applications and data for the flight of an aircraft like, for example, a flight plan, are now accessible from the aircraft cockpit to all persons who have access to the cockpit. In other words, any person who has access to the aircraft, and particularly the cockpit, can have access to all the avionic applications and data recorded in the aircraft computer and intended to be displayed on the screens in the cockpit.

Some of these applications and data, hereinafter called avionic information, are confidential and should be known only to certain people, like the crew navigating the aircraft. Particularly in the field of military aeronautics, it is essential that certain information remain secret while the aircraft is on the ground. For example, in certain secret missions, the flight plan of a military aircraft should be known only to the pilot and his navigation crew. On such missions, to make sure the flight plan is confidential, it is important that none of the personnel who have access to the aircraft on the ground, for example the maintenance technicians, can learn the flight plan.

There is currently no technical means of controlling access to avionic applications and data, i.e., information that can be displayed on the cockpit screens.

What is more, access to avionic information is currently anonymous, which means that there is no tracking the information viewed and the actions performed by the people in the aircraft cockpit. It is therefore impossible to see, afterward, a list of people who used avionic applications or viewed avionic data. However, it can be important, in the case of military missions or in the event of an incident, to have a list of the people who had access to the different avionic information.

The purpose of the disclosed embodiments is to remedy the disadvantages of the techniques described above. To this end, the disclosed embodiments propose a process and a system that make it possible to control access to avionic applications and data. To do so, the disclosed embodiments propose equipping each user who could access the aircraft with an identification card and using an identification device connected to an avionic computer to read these ID cards and determine the user's access rights to avionic information. Based on his/her access rights, the user can use certain applications and view certain data or access all or none of the information. Applications and data are authorized to be displayed on screens in the aircraft only if the person's access rights permit it.

More specifically, the disclosed embodiments concern a system for managing user access rights to avionic information loaded onboard an aircraft, wherein it includes:
 at least one identification device able to read the user's identity information contained on a personal card, and
 an avionic computer having means of managing access rights that can authenticate the user and determine access rights to the avionic information based on the user's identity.

The system in the disclosed embodiments can also include one or more of the following characteristics:
 the identification device is able to read a chip card that has an identification code and the user's access rights.
 the identification card can read a biometric card and access rights stored in a database.
 the identification device is a card reader.
 the avionic computer is connected to a display management system to which it transmits authorization to display and/or prohibits it.
 several work stations are connected to the avionic computer and at least one identification device is associated with each work station.

The disclosed embodiments also relate to a process for managing a user's access rights to avionic information, wherein it performs the following operations:
 reads a personal card and determines the user's identity,
 transfers the user's identity to the avionic computer,
 determines, via the avionic computer, the user's access rights to the avionic information, based on his/her identity,
 sends authorization to display avionic information to display devices in the aircraft or prohibits it.

The process in the disclosed embodiments can also include one or more of the following characteristics:
 it includes an operation for recording the information displayed by the user and actions performed by said user.
 the access rights management [system] is deactivated automatically when the aircraft is in flight and activated automatically when the aircraft is on the ground.
 it includes an operation to authenticate the personal card.

The disclosed embodiments also concern an aircraft having the system, as described above.

DETAILED DESCRIPTION

Figure 1:
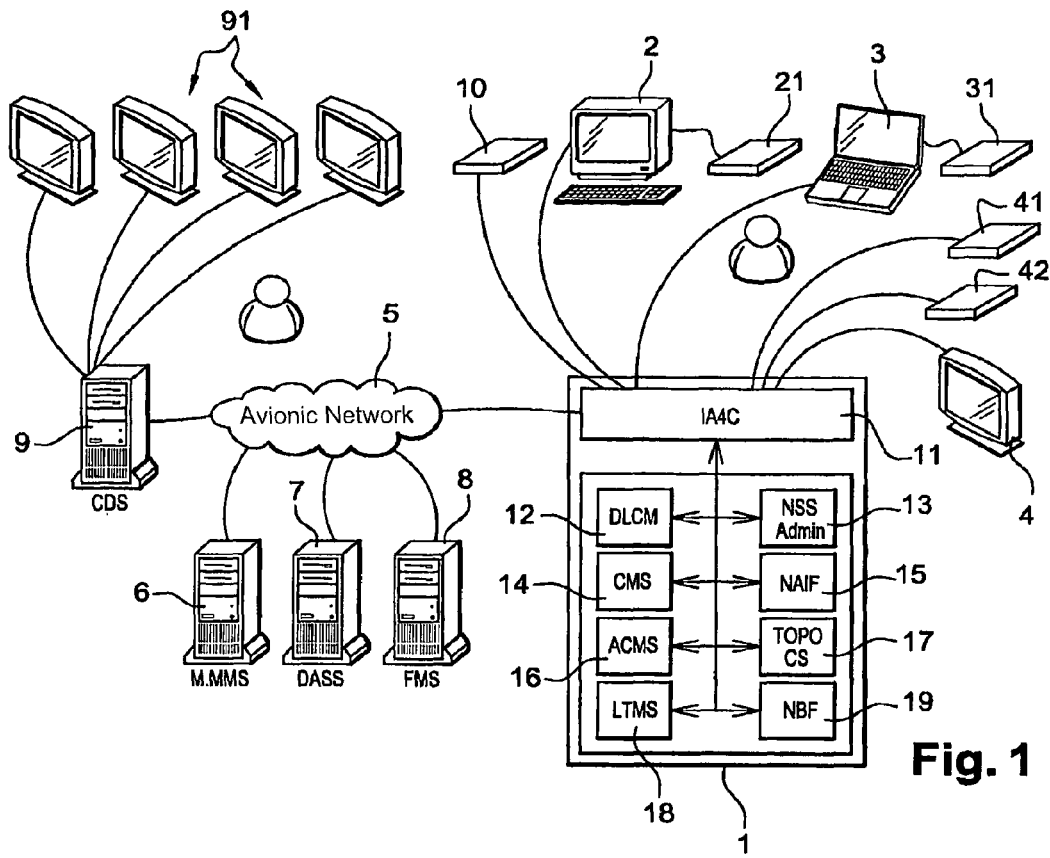
FIG. 1 shows the access control system in the disclosed embodiments installed in the electronic equipment loaded on board the aircraft.

The disclosed embodiments propose a system and a process for controlling access to avionic information. To do so, the disclosed embodiments propose granting access rights to each user able to access an aircraft. These access rights are personalized based on the user's identity. These access rights are authorizations/prohibitions to access certain avionic information, namely avionic data or applications. Access authorization or prohibition can be granted to a particular user or group of users, for a specific application or data, or for a type of application or type of data. In other words, the disclosed embodiments propose authorizing or refusing access to certain avionic information based on the user's identity or the user's being in a category of users, such as the category of maintenance technicians, the category of pilots, the category of security agents, the category of loading personnel, etc. The disclosed embodiments make it possible, for example, to authorize all pilots to access all avionic information, to authorize aircraft computers to be updated only by authorized personnel, to prohibit access to aircraft mission data to all personnel other than the crew, etc.

According to the disclosed embodiments, each user therefore has personal access rights. These access rights are associated with the user's identity. In the rest of the description, we will use the term "user's identity" to include all information related to the user, such as his/her name and date of birth or the category of users into which he/she falls.

In the disclosed embodiments, each user is equipped with a personal card, also called an identification card, containing information on the user's identity. This personal card can be a chip card, a magnetic card, a biometric card, etc., or any type of card that makes it possible to store information on the user's identity.

In one embodiment of the disclosed embodiments, the personal card contains only information on the user's identity. This is the case, for example, for a biometric card. As will be seen in more detail further on, the access rights granted to each user in this embodiment are stored in a database connected to the aircraft computer.

In the preferred embodiment of the disclosed embodiments, the personal card, for example a magnetic card or a chip card, contains, in addition to identification information, an identification code that makes it possible for the user to be authenticated by the system in the disclosed embodiments. This identification code can be a PIN code (Personal Identification Number in English) or any other type of secret code. This identification code allows the system in the disclosed embodiments to make sure that the person who presents the identification card is indeed the holder of said card.

In this embodiment, the personal card can also contain the user's access rights. In that case, the user's access rights are recorded in a memory area on the card itself.

The personal cards, as they have just been described, can be used only to manage the access rights of the personnel. The personal cards can also be multi-purpose cards, used for other functions (like the interoperability of the card with ground mission preparation and maintenance systems). In that case, the access rights to the avionic applications and data are added to the existing card.

According to the disclosed embodiments, user authentication and access control to avionic information is done by means of an access rights management application called application IA4CS (Identification, Authentication, Accounting, Audit and Access Control in English). This access rights management application is housed in an applications server on the aircraft, loaded onboard the aircraft. This avionic computer supports a plurality of traditional avionic applications in addition to the access rights management application.

FIG. 1 shows an example of the access control system for avionic information in the disclosed embodiments. This system includes the avionic computer 1 described above. This computer 1 is connected to the different electronic equipment on the aircraft. It is connected specifically:

- to a fixed workstation 2 in the cockpit, called an AMAT station (Aircraft Multipurpose Access Terminal, in English).
- to a portable multi-tasking workstation 3, called a PMAT (Portable Multipurpose Access Terminal, in English) connected to the computer by a wired or wireless link, and
- to a loading terminal in the bays 4.

As will be seen in more detail further on, the computer 1 is also connected to different systems on the aircraft via an avionic network 5.

According to the disclosed embodiments, the computer 1 is also connected to at least one identification device. The identification device is a card reader adapted to the type of cards used as personal cards. In the preferred embodiment of the disclosed embodiments, the personal card is a chip card and the identification device is a chip card reader.

In the example in FIG. 1, the system in the disclosed embodiments includes several card readers. It has a first card reader 10 connected directly to the computer 1. This first card reader 10 is installed in the cockpit, for example within proximity of the screens in the cockpit. It also has card readers placed within proximity of the different workstations in the aircraft. In the example in FIG. 1, a second card reader 21 is installed within proximity of the AMAT station 2. This second card reader 21 is connected to the computer 1 via said AMAT station. A third card reader 31 is installed within proximity of the PMAT station 3. This third card reader 31 is connected to the computer 1 via said PMAT station. Fourth and fifth card readers 41, 42 are installed in the bay. They are connected directly to the computer 1.

In the example in FIG. 1, the avionic computer 1 hosts numerous applications necessary for the flight of the aircraft, such as pilot help applications. In the example in FIG. 1, the computer 1 supports a data location and configuration system DLCS 12, a centralized maintenance system CMS 14, an aeronautic condition management system ACMS 16, a lifetime management system LTMS 18, an administrative function 13 of the NSS server, a network aeronautic instrumentation function NAIF 15 of the communications router, a take-off and landing help system TOPOCF 17 and a network management function NBF 19. According to the disclosed embodiments, the avionic computer 1 also includes an access rights management application IA4C. This access rights management application 11 provides both user authentication and access rights management for that user.

The avionic computer is connected, via the authentication application, to the work stations. The avionic computer is also connected to different control systems via a network. In the example in FIG. 1, the avionic computer is connected to the flight management system FMS, the defense assistance system DASS and the military missions management system MMMS. The avionic computer is also connected to a control display system CDS. This display control system manages data to be displayed on the different screens in the cockpit.

Thus, a user who wants to access avionic information must insert his/her personal card in one of the card readers of the system. If no card is inserted in one of the card readers, no access authorization is given, i.e., no information is displayed on any screen in the cockpit. The request for avionic information must necessarily go through the access rights management application 11. To do so, a personal card must have been read by one of the readers, which then transmits the identity information read on the card to the access rights management application 11 in the computer 1. On receiving this identity information, the computer 1, and in particular the application 11 in the computer, authenticates the user by means of his identification code. If the user is not authenticated, no display is authorized. If the user is authenticated, the computer 1 determines that user's access rights based on the user's identity. The computer then gives access to the avionic information that the user is authorized to use. The computer gives access to avionic information by transferring, to the devices or applications concerned (i.e., the devices or applications that host the avionic information sought) an authorization or prohibition to display the information.

In the embodiment in FIG. 1, the computer 1 is connected by the avionic network 5 to a cockpit display system CDS. The system 9 for managing displays is a device that manages and controls the display of different avionic information on the different cockpit screens 91. This display management system 9 is itself connected by the avionic network 5 to a plurality of computers, such as the flight management computer 8, the defense assistance computer DASS 7 and the military missions' management computer 6. The display management system 9 receives information from the different computers and generates the cockpit display based on that information.

Thus, after determining the user access rights, the computer 1 transmits these access rights to the different display devices in the aircraft, particularly, the display management system. In other words, it sends, over the avionic network 5 to the display management system 9 and to any other potential display devices, a list of the information authorized and/or prohibited for display by the user. In a first variation, the display management system 9 then displays only the avionic information authorized from all the information furnished by the different computers. In a second variation, the display management system 9 filters the prohibited information to display only the information that is not prohibited. The aircraft screens thus display only the avionic information authorized according to the rights of the user authenticated.

Figure 2:
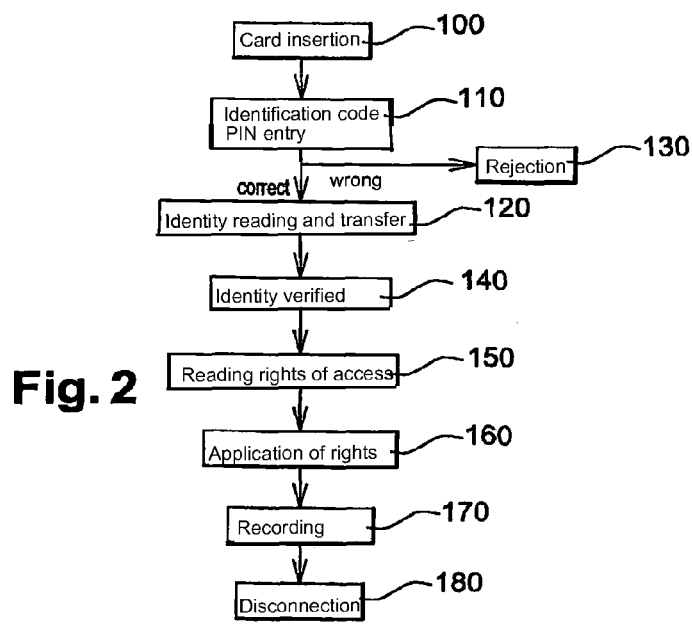
FIG. 2 shows a working diagram of the access control process in the disclosed embodiments.

FIG. 2 shows a working diagram of the process used by the system in the disclosed embodiments. This process includes a first step 100 in which the user inserts his personal card in the card reader.

The card reader asks the user to enter his identification code, or PIN code. In step 110, the user enters his identification code on the keyboard of the card reader. If the PIN code entered is correct, i.e., if it corresponds to the personal card inserted in the reader, then the process goes on to step 120. If the PIN code is wrong, then the card reader can offer the user a second or even a third try. If, the PIN code is still invalid on the third try, then the personal card is rejected in step 130 and no display is authorized on the aircraft screens.

When the PIN code is correct, then the user's identity information recorded on the personal card is read and sent to the access rights management application in the computer 1 (step 120). The computer 1 then verifies the authenticity of the personal card in step 140.

In step 150, the computer 1 looks for the user's access rights that were just authenticated. As already explained, the access rights of each user can be recorded directly on the user's personal card. This is the case, for example, when the personal card is a chip card. This embodiment has the advantage of making it easier to read the identity information. It also has the advantage of giving the airlines or the army the possibility of recognizing only the personal cards configured by their organizations on the aircraft and canceling personal cards that could have been lost. On the other hand, updating the access rights requires reading and changing each of the cards whose users are affected by the update card by card.

The user access rights can also be recorded in a database connected to the computer 1. This is the case, for example, when the personal card is a biometric card. In this embodiment, the access rights of all the users are put in the same device. This makes it easier to update the access rights by simultaneously changing the access rights of all users concerned.

If the access rights are recorded on the personal card, the computer 1 simply reads these access rights on the card. If the access rights are stored in a database, then the computer 1 will search the database for the access rights for the user it has authenticated.

Once they are read, the access rights are applied in step 160. Application of the access rights consists of sending an authorization or prohibition to display certain avionic information to the display devices or to the display management system. The avionic information authorized is then displayed on the screens in the cockpit and/or the screens of the workstation to which the card reader used is connected. For example, if the user used the cockpit card reader, connected to the multitask access terminal AMAT, then the authorized information is displayed on the cockpit screens and the AMAT screens. If the user used the card reader connected to the PMAT portable terminal or bay terminal, then the authorized information is displayed on the screens of the terminal used, the PMAT terminal screens or the bay terminal screens, respectively.

As already explained, in this step of the process, the user has access to the different information that he/she has a right to consult. The user can therefore perform the action necessary to do his/her job correctly.

In one preferred embodiment of the disclosed embodiments, the different actions performed by the user are recorded, in step 170, so they can be used later on. This recording of the users' actions provides a way of tracking access to avionic information. This tracking makes it possible, in the event of an incident, to have a later look at the action performed by the different users and the information viewed before the incident. In other words, this tracking of access to avionic information makes it possible to perform an audit and consult the access to the information after the fact.

What is more, by tracking the actions of the people who are authenticated by the system, the disclosed embodiments make it possible to limit access to avionic information based on user rights and to cancel access to that information, for example, when a person has changed jobs or a personal card has been lost.

In one embodiment of the disclosed embodiments, when the user has finished using the avionic information he/she needs, he/she must disconnect from the system (step 180). To do so, the user inserts his/her personal card back into the card reader, preferably into the same card reader as the one into which he/she initially inserted his/her personal card. Depending on the variations, he/she may have to enter his/her new identification code. When the computer detects the identity of the same user as the one authenticated before, it then considers the information display procedure for that user finished. This disconnection step by reinserting the personal card allows the user to take out his/her card and be authenticated on other terminals.

In one preferred embodiment of the disclosed embodiments, for security reasons, the access rights management system is automatically deactivated when the aircraft is in flight so that the whole crew onboard can access all the avionic information On the contrary, when the aircraft is on the ground, the system in the disclosed embodiments is automatically reactivated.

The invention claimed is:

1. An access rights management system for providing a user access to avionic information loaded onboard an aircraft, said system comprising:
   at least one identification device that can read information regarding the identity of the user contained on a personal card, and
   an avionic computer connected to the identification device and having applications necessary for a flight of the aircraft, as well as means of managing access rights, capable of authenticating the user and determining access rights to the avionic information based on the user's identity, and
   a display management system connected to the avionic computer to which display management system said computer sends one of an authorization and a prohibition,
   the avionic computer recording the avionic information viewed by each user and the actions performed by each user and further automatically deactivating the access rights management system when the aircraft is in flight and automatically activating the access rights management system when the aircraft is on the ground.

2. The system according to claim 1, wherein the identification device is able to read the personal card in the form of a chip card with an identification code and access rights of the user.

3. The system according to claim 1, wherein the identification device is able to read the personal card in the form of a biometric card and the access rights are stored in a database.

4. The system according to claim 1, wherein a plurality of work stations are connected to the avionic computer and wherein at least one identification device is associated with each work station.

5. An aircraft including the access rights management system according to claim 1.

6. The system according to claim 1, wherein the system is configured to require the user to disconnect from the system when the user has finished using the avionic information.

7. The system according to claim 1, wherein the access rights management system is housed in an applications server on the aircraft.

8. A process for managing a user's access rights to avionic information in an aircraft, comprising the steps:
   reading a personal card and determining the user's identity,
   transferring the user's identity to an avionic computer,
   determining, via the avionic computer, the user's access rights to avionic information based on the user's identity,
   sending to a display management system one of an authorization to display the avionic information to aircraft display devices and a prohibition against the avionic information being displayed on the aircraft display devices,
   recording avionic information viewed by the user and actions performed by the user, and
   automatically deactivating the process for managing a user's access rights when the aircraft is in flight and automatically activating the process for managing a user's access rights when the aircraft is on the ground.

9. The process according to claim 8, including a step of authenticating the personal card.

10. The process according to claim 8, including a step of disconnecting the user from an access rights management system upon the rereading of a user's personal card at a card reader used to first read the user's personal card.

* * * * *